May 9, 1967 B. BEJACH 3,318,547
TAPE TRANSPORT SYSTEM
Filed Sept. 28, 1964
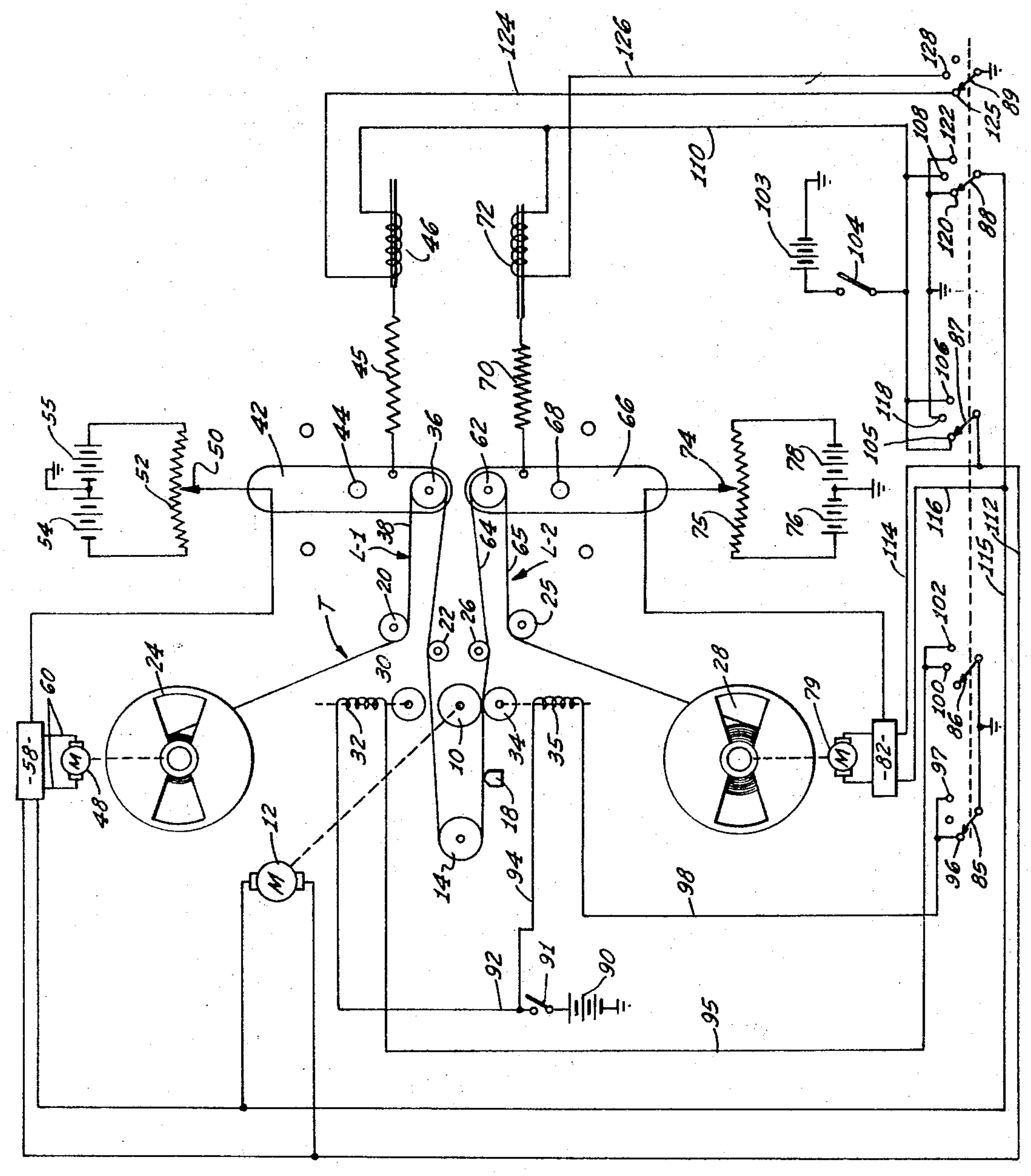
INVENTOR:
Benton Bejach
By Smyth, Roston & Pavitt
Attorneys 3,318,547

TAPE TRANSPORT SYSTEM

Benton Bejach, Los Angeles, Calif., assignor to Minnesota Mining and Manufacturing Company, St. Paul, Minn., a corporation of Delaware Filed Sept. 28, 1964, Ser. No. 399,518
11 Claims. (Cl. 242—55.12)

This invention relates to a tape transport system of the type wherein nip-roller means presses the tape against the periphery of a drive capstan to actuate the tape. In such a system, transducer means for recording and reproducing signals is positioned in contact with the tape and suitable proviison is made for maintaining the tape adjacent the transducer means under tension.

In a widely used arrangement, suitable guide means including a return idler cooperates with the drive capstan to form a central loop in the traveling tape with the two legs of the central loop positioned on opposite sides respectively of the drive capstan and two retractable nip-rollers are arranged to press the two legs of the tape against the drive capstan to isolate the central loop from both the supply reel and the take-up reel. The transducer means is located adjacent the central loop and the central loop is maintained under tension by using a differential capstan and cooperating nip-rollers having operating surfaces of two slightly different diameters. With the velocity of the ingoing leg of the central loop determined by the smaller diameter and the velocity of the outgoing leg determined by the larger diameter, the higher velocity of the outgoing leg maintains the central loop under the desired tension.

One disadvantage of such a tape support system is that the system cannot be operated in reverse for recording and reproducing signals because the differential in diameters for creating tension is operative in only one direction of tape travel. Another disadvantage is that the tape is laterally distorted to conform to the two different diameters of the drive capstan and nip-rollers and this distortion not only tends to cause uneven pressure of the tape against the transducer means but also tends to create skew, flutter and other effects to distort the signals. Still another disadvantage is that the inertia of the large masses of tape concentrated in the supply reel and in the take-up reel, respectively, prevents desirable abruptness in the acceleration and deceleration of the tape.

The present invention avoids these disadvantages by three provisions which work together. One provision is to press only one of the two nip-rollers against the capstan so that the nip-roller in cooperation with the drive capstan divides the traveling tape into two sections, one section being associated with one of the two reels, the other section being associated with the other of the two reels. The previously mentioned central loop adjacent the transducer means is included in one of the two sections that are divided from each other by the nip-roller that is in operation.

The second provision is to provide two servo loops, one for each of the two reels, to regulate the tension in the corresponding two sections of the traveling tape. Each servo loop includes means to sense the tension of the tape and to govern the rotation of the corresponding reel in accord with the tension.

The third provision is to make the two servo loops adjustable to maintain two different magnitudes of tension selectively. The two servo loops are adjusted to maintain a relatively high tension in whichever of the two sections of tape includes the central loop where signals are recorded and reproduced and to maintain a lower normal tension in the other of the two section.

The new tape transport system is reversible to record and reproduce signals in both directions of tape travel. Travel of the tape in one direction for recording and reproducing signals is accomplished by rotating the drive capstan and the two reels in one direction with one of the two nip-rollers in its effective position and with one of the two servó loops adjusted to raise the tension in the tape section that includes the central loop. The tape is operated in the reverse direction for recording and reproducing signals by rotating the drive capstan and the two reels in the opposite direction with the other of the two nip-rollers in operation and with the other of the two regulating means adjusted for high tape tension.

The new tape transport system makes it possible to start and stop the tape in a nearly instantaneous manner because the two servo loops store quantities of tape and operate automatically to increase or decrease the amount of stored tape to isolate the inertia effects at the two reels from the central loop of the tape. Snce the few inches of the central loop of the tape has an exceedingly low mass, the central loop of the tape in the region of the transducer means may be substantially instantaneously accelerated by shifting a nip-roller against the tape and may be substantially instantaneously decelerated by retracting the nip-roller.

A feature of the invention is that, if desired, it may incorporate a differential capstan arrangement to provide a third mode of operation. The first two modes of operation are the two modes described above for opposite directions of travel of the tape with only one nip-roller in contact with the tape. In the third mode of operation both nip-rollers press the tape against the drive capstan to isolate the central loop in the conventional manner and both of the storage loops are adjusted to maintain the same tension in the two sections of the tape associated therewith.

The features and advantages of the invention may be understood from the following detailed description and the accompanying drawing.

The accompanying drawing, which is to be regarded as merely illustrative and not limiting the invention, shows a diagram of a selected embodiment of the invention.

The tape transport system which is illustrated by the drawing incorporates a well known arrangement in which a drive capstan 10 driven by a motor 12 cooperates with a return idler 14 to form a traveling tape T into a central loop, generally designated L, that has two legs 15 and 16 with one of the two legs adjacent transducer means 18 for recording or reproducing signals. Suitable guide means including guide rollers 20 and 22 route the tape between a first reel 24 and the drive capstan and additional guide means including guide rollers 25 and 26 route the tape between the drive capstan and a second reel 28. Associated with the drive capstan 10 is a first nip-roller 30 which may be actuated by a solenoid 32 to press the leg 15 against the drive capstan and a second nip-roller 34 which may be actuated by a second solenoid 35 to press the second leg 16 to press against the drive capstan.

In the present embodiment of the invention it is contemplated that the tape transport system will have the three different modes of operation that have been heretofore mentioned. To make the third mode of operation possible, the drive capstan 10 is of the different type and the two nip rollers 30 and 34 may both be actuated simultaneously for a differential effect to place the central loop L under tension.

Such a differential drive capstan and two cooperating nip-rollers are disclosed for example, in the Mullin Patent 3,093,284 wherein the nip-roller 30 cooperates with a portion or portions of the drive capstan 10 of a given diameter and the nip-roller 30 or 34 cooperates with a portion or portions of the drive capstan of slightly larger diameter. Thus with both nip-rollers 30 and 34 simultaneously actuated to press the tape against the opposite sides of the drive capstan 10 and with the tape traveling from the first reel 24 to the second reel 28, the outgoing leg 16 of the central loop L is driven at a slightly higher velocity than the ingoing leg 15 to place the central loop under the desired degree of tension.

It is to be understood, however, that if the third mode of operation is not required both the drive capstan 10 and the two nip-rollers 30 and 34 may be of simple cylindrical configuration of uniform diameter.

In accord with the teachings of the present invention, a first storage roller 36 cooperates with the guide rollers 20 and 22 to form a first portion of the tape into a first storage loop L–1 having two legs 38 and 40. For this purpose the storage roller 36 is mounted on a suitable movable support in the form of a lever 42 mounted on a pivot 44. A suitable spring 45 adjustably connected to a solenoid 46 acts on the lever 42 in a direction to tend to extend or increase the size of the storage loop L–1.

The reel 24 is driven by a motor 48 the speed of which is controlled in response to changes in the magnitude of the storage loop L–1. For this purpose the second arm of the lever 42 carries a wiper or brush 50 that traverses a potentiometer resistor 52. One end of the resistor 52 is in series with a grounded battery 54 and the other end of the resistor is in series with a second similar battery 55 of the same polarity. Thus when the wiper 50 is in the neutral position shown in the drawing, the wiper is at zero voltage. If the first reel 24 is serving as a supply reel and the wiper 50 is shifted rightward from its neutral position in response to decrease in the magnitude of the first storage loop L–1, the wiper is charged with increased positive voltage, and, on the other hand, if the wiper shifts leftward from its neutral position in response to increase of the magnitude of the loop L–1, the wiper is charged with increasing negative voltage.

The wiper 50 is connected by a conductor 56 with a control unit 58 which in turn is connected to the motor 48 by a pair of wires 60. The control unit 58 which, as will be explained, is connected to a suitable source of direct current is of a well known construction which varies the speed of the motor 48 in accord with the signals from the wiper 50. Thus with the tape traveling from the reel 24 to the reel 28 the wiper sends a negative voltage signal to the control unit 58 to slow down the motor 48 when the magnitude of the storage loop increases and sends a positive voltage signal to the control unit to accelerate the reel 32 when the magnitude of the storage loop L–1 decreases.

A second storage roller 62 cooperates with the guide rollers 25 and 26 to form a second storage loop L–2 having two legs 64 and 65. Here again the storage roller 62 is mounted on a movable support in the from of a second lever 66 mounted on a pivot 68. A second spring 70 adjustably anchored to a solenoid 72 acts on the lever 66 to tend to extend or increase the second storage loop L–2.

The second arm of the lever 66 carries a brush or wiper 74 which traverses a potentiometer resistor 75. One end of the resistor 75 is in series with a grounded battery 76 and the second end is in series with a second similar grounded battery 78, the polarity of the two batteries 76 and 78 being opposite to the polarity of the two previously mentioned batteries 54 and 55. Thus when the wiper 75 moves rightward from its neutral position the wiper is charged negatively with increasing voltage and when the wiper shifts to the left it is charged positively with increasing voltage.

The reel 28 is actuated by a motor 79 in accord with changes in magnitude of the second storage loop L–2. For this purpose the motor 79 is connected by a pair of wires to a control unit 82 which in turn is connected to a suitable source of D.C. current. The wiper 74 is connected to the control unit 82 by a conductor 84. Here again the control unit 82 is of a well known construction to vary the speed of the motor 79 in accord with the polarity and voltage of the signals from the wiper 74. With the tape traveling in the direction for the reel 28 to serve as a take-up reel, increase in the size of the second storage loop L–2 causes the wiper 74 to shift leftward to send a positive signal to the control unit 82 to accelerate the reel 28. On the other hand when the second storage loop L–2 decreases in magnitude under these conditions the wiper 74 shifts to the right to send a negative voltage signal to the control unit 82 to retard the motor 78.

The tape transport system is controlled by a master switch having five interlocked switch arms, namely, two switch arms 85 and 86 to control the two nip-rollers 30 and 34 respectively, two switch arms 87 and 88 to control the energization and direction of rotation of the three motors 12, 48 and 79, and a single switch arm 89 to control the two solenoids 46 and 72 for stressing the two springs 45 and 70.

In the arrangement shown in the drawing, the battery 90 for energizing the two solenoids 32 and 35 for the two nip-rollers 30 and 34, respectively, is grounded on one side and on the other side is in series with an auxiliary switch 91 which is connected by a wire 92 to the solenoid 32 and by a wire 94 to the solenoid 35. A return wire 95 connects the solenoid 32 to two contacts 96 and 97 at the first and third positions, respectively, of the grounded switch arm 85. A return wire 98 from the solenoid 35 is connected to two contacts 100 and 102 at the second and third positions, respectively, of the second grounded switch arm 86.

The master switch has three positions, the first of which is shown in the drawing. At the first position of the master switch the first switch arm 85 is at the contact 96 to energize the solenoid 35, the solenoid 32 being deenergized. At the second position of the master switch, the solenoid 35 is deenergized and the second switch arm 86 is at the contact 100 to energize the solenoid 32. At the third position of the master switch the first switch arm 85 is at the contact 97 to energize the solenoid 35 and the second switch arm 86 is at the contact 102 for simultaneous energization of the solenoid 32.

The three motors 12, 48 and 79 as well as the two spring-adjusting solenoids 46 and 72 are energized by a grounded battery 103 through an auxiliary switch 104. The switch 104 is connected to a pair of contacts 105 and 106 at the first and third positions, respectively, of the switch arm 87 and is connected to a contact 108 which is located at the second position of the switch arm 88. The switch 104 is also connected by a wire 110 to the two spring-adjusting solenoids 46 and 72.

The switch arm 87 is connected by a wire 112 with one side of the motor 12 and one side of the control unit of the motor 48 and is connected by a wire 114 to one side of the control unit of motor 79. A return wire 115 from the motor 12 and the control unit of the motor 48 and a return wire 116 from the control unit of motor 79 are connected to the second switch arm 88. A contact 118 located at the second position of the switch arm 87 and contacts 120 and 122 located at the first and third positions of the switch arm 88 are grounded.

A return wire 124 from the spring-adjusting solenoid 46 is connected to a contact 125 at the first position of the fifth switch arm 89 and a return wire 126 from the spring-adjusting solenoid 72 is connected to a contact 128 at the second position of the switch arm 89.

The manner in which the described tape transport system functions for its purpose may be readily understood from the foregoing description.

The drawing shows the tape transport system readied for what may be termed its first mode of operation. The master switch having switch arms 85–89 is at its first position and both auxiliary switches 91 and 104 are open.

The tape is started by closing the two auxiliary switches 91 and 104.

Closing switch 91 completes a circuit through the solenoid 35 to cause the corresponding nip-roller 34 to press the tape against the drive capstan 10, the other solenoid 32 being deenergized with the nip-roller 30 spaced from the drive capstan.

Closing the auxiliary switch 104 causes the two switch arms 87 and 88 to complete circuits through the three motors 12, 48 and 79 for travel of the tape in the direction from the first reel 24 to the second reel 28 and at the same time completes a circuit through the spring-adjusting solenoid 46 to pull on the spring 45.

The pressure of the nip-roller 34 against the drive capstan 10 divides the tape into an ingoing section and an outgoing section. The ingoing section extends from the first reel 24 to the nip-roller 34 and includes both the first storage loop L–1 and the central loop L. The second tape section extends from the nip-roller 34 to the reel 28 and includes the second storage loop L–2.

In the absence of energization of either of the two spring-adjusting solenoids 46 and 72, each of the two springs 45 and 70 maintains a relatively low tension in the corresponding storage loop. In the first mode of operation, however, the closing of the switch 104 causes the fifth switch arm 89 to close a circuit through the spring-adjusting solenoid 46 to increase the tension of the spring 45 and thereby raise the tension of the first storage loop L–1 to a higher magnitude. Thus the whole first section of the loop up to the nip-roller 34 is increased in tension for effective cooperation between the traveling tape and the transducer means 18. For ½-inch tape the relatively low tension may be 4 ounces and the relatively high tension may be 20 ounces. It is assumed in this instance that ½-inch tape is used.

Energizing the spring-adjusting solenoid 46 is effective to raise the tension in the tape in the first storage loop L–1 because the wiper 50 continuously seeks a central position along the resistor 52 without regard to changes in spring force. If the magnitude of the first storage loop L–1 increases with consequent leftward shift of the wiper 50, the wiper becomes charged negatively with increasing voltage and the resulting negative signal to the control unit 58 slows down the reel 24. On the other hand if the magnitude of the first storage loop drops below normal the consequent rightward shift of the wiper 50 sends a positive signal to the control unit 50 to speed up the reel 24. Thus the spring 45, the lever 42, the wiper 50, the resistor 52 and the control unit 58 provide a servo loop for maintaining a predetermined tension in the first storage loop L–1.

It is apparent that the second reel 28 is regulated by a second servo loop which includes the spring 70, the lever 66, the wiper 74, the resistor 75 and the control unit 82. Since the spring-adjusting solenoid 72 is not energized for the first mode of operation of the system, the second servo loop maintains the tape in the second storage loop at the lower tension of 4 ounces.

Since the effect of a take-up reel on its associated storage loop is opposite from the effect on a supply reel on its associated storage loop, the signals generated by the wiper 74 must be opposite in polarity from the signals generated by the wiper 50. Thus when the magnitude of the second storage loop L–2 rises above normal, the consequent leftward shift of the wiper 74 sends a positive signal to the control unit 82 to speed up the reel 28 instead of sending a negative signal to slow up the reel and when the second storage loop drops below normal in magnitude, the consequent rightward shift of the wiper 74 sends a negative signal to the control unit 82 to slow up the reel 28 instead of sending a positive signal to speed up the reel.

The second mode of opertaion with the master switch at the second position is similar to the first mode but the tape travels in the opposite direction for recording and reproducing signals. With the switch arm 85 of the master switch at its second position and with switch 91 closed the solenoid 35 is deenergized for retraction of the nip-roller 34 and with the switch arm 86 of the master switch at the contact 100, the solenoid 32 is energized to cause the nip-roller 30 to press the tape against the drive capstan 10. With the switch 104 closed and the switch arms 87 and 88 at their second positions the current flow through the three motors 12, 48 and 79 is reversed to reverse their directions of rotation and thus cause the tape to travel from the second reel 28 to the first reel 24. At the same time the switch arm 89 is at the contact 128 to energize the spring-adjusting solenoid 72 to raise the tension in the second storage loop L–2.

In this second mode of operation with the nip-roller 30 cooperating with the drive capstan 10 to divide the leg into an ingoing section from the reel 28 and an outgoing section to the reel 24, here again the transducer 18 is adjacent the ingoing section and here again the ingoing section of the tape is at the relatively high tension of 10 ounces because the spring-adjusting solenoid 72 is energized.

Since the reel 24 now serves as a take-up reel instead of a supply reel and the reel 28 serves as a supply reel instead of a take-up reel, the corresponding servo loops must also be reversed with respect to their responses to changes in magnitudes of the two storage loops L–1 and L–2. This reversal occurs automatically, however, because of the reversal in the direction of flow of the direct current through the motors 48 and 79. When the flow of current through a reel motor is in one direction, a control signal of a given polarity increases the speed of the reel whereas the same signal decreases the speed if the current flow through the reel motor is in the opposite direction. Thus in the second mode of operation in which the direction of travel of the tape is reversed, the first servo loop controls the reel 24 in the correct manner for a take-up reel and the second servo loop controls the reel 28 in the correct manner for a supply reel.

In the third mode of operation, both of the nip-rollers 30 and 34 press the tape agains the drive capstan 10 with both of the spring-adjusting solenoids 46 and 72 deenergized for equal tension in the two storage loops L–1 and L–2. The two nip-rollers 30 and 34 cooperate with the drive capstan 10 in the conventional differential manner to place the tape in the central loop L under tension for effective co-action of the tape and the transducer means 18.

With both of the auxiliary switches 91 and 104 open, the system may be readied for the third mode of operation by changing the master switch to its third position and then closing the switch 104 to complete circuits to the three motors 12, 48 and 79. With the switch arm 87 at the contact 106 and the switch arm 88 at the contact 122, the three motors are energized in the same direction of rotation as in the first mode of operation to cause the tape to travel from the reel 24 to the reel 28. Only the capstan motor 12 actually rotates in response to the closing of the switch 102, however, because with the fifth switch arm 89 at its third position neither of the spring-adjusting solenoids 46 and 72 is energized with the consequence that both of the storage loops L–1 and L–2 are of equal relatively low tension so that neither servo loop energizes its corresponding reel motor.

With the capstan 14 continuously rotating, the switch 91 is then closed to shift the two nip-rollers against the drive capstan to start and stop the tape in the usual manner. Obviously in this third mode of operation, recording and reproducing of signals may be carried out only with the tape running in the one direction from the reel 24 to the reel 28. To rewind the reel the master switch may be adjusted for the second mode of operation of the system.

It will be apparent to those skilled in the art that the drive capstan 10 and the two nip-rollers 30 and 34 may be of uniform diameter to eliminate the differential effect, the third mode of operation being omitted. The advantage of such an arrangement is that the tape makes contact with only smooth surfaces of uniform diameter thus avoiding the distortion of the tape that is inevitable in the use of a differential capstan. It is to be noted, however, that if the drive capstan and the two nip-rollers 30 and 34 are designed for differential action to permit the third mode of operation of the system, only one nip-roller is in use for the first and second modes of operation and a single nip-roller distorts the tape much less than two nip-rollers.

My description in specific detail of the selected embodiment of the invention will suggest various changes, substitutions and other departures from my disclosure within the spirit and scope of the appended claims.

I claim:

1. In a tape transport system, the combination of:
a supply reel;
a take-up reel;
a drive capstan;
guide means to direct the tape from the supply reel to the drive capstan and from the drive capstan to the take-up reel;
a nip-roller to press the tape against the drive capstan to drive the tape and thus divide the traveling tape into an ingoing section from the supply reel and an outgoing section to the take-up reel;
transducer means adjacent one of said two sections of the tape; and
means to sense the tension in the two sections of the tape, respectively and to regulate the two reels, respectively, in accord with the sensed tensions to maintain given tensions in the two sections with the given tension always substantially higher in said ingoing section than in the outgoing section.

2. In a tape transport system, the combination of:
a supply reel;
a take-up reel;
a drive capstan;
guide means to direct the tape from the supply reel to the drive capstan and from the drive capstan to the take-up reel;
a nip-roller to press the tape against the drive capstan to drive the tape and thus divided the traveling tape into an ingoing section from the supply reel and an outgoing section to the take-up reel;
transducer means adjacent one of said sections of the tape;
a first servo loop including means to sense the tension in the ingoing section of the tape together with means to regulate the rotation of the supply reel to maintain the tension at a given magnitude;
a second servo loop including means to sense the tension in the outgoing section of the tape together with means to regulate the rotation of the take-up reel to maintain the tension in the outgoing section at a given magnitude; and
control means operable to move the nip-roller from a retracted position to an effective position to press the tape against the drive capstan and simultaneously to adjust the servo loop corresponding to said ingoing section of the tape to raise the tension of said ingoing section above the tension of the outgoing section.

3. In a tape transport system, the combination of:
a first reel;
a second reel;
a drive capstan;
a return idler;
guide means to guide the tape between the two reels to form the tape into a loop around the return idler with the two legs of the loop adjacent opposite sides of the drive capstan;
transducer means adjacent one of the two legs of the loop;
two normally retracted nip-rollers positioned adjacent the two legs respectively of the tape, each nip-roller being movable from a retracted position to an operating position to press the corresponding leg of the tape against the drive capstan for actuation of the tape and to divide the tape into two sections connected to the two reels respectively;
first regulating means to maintain tension in the section of tape that is connected to the first reel, said first regulating means being adjustable to maintain the tape tension at either a relatively low magnitude or a reltaively high magnitude;
second regulating means to maintain tension in the section of tape that is connected to the second reel, said second regulating means being adjustable to maintain the tape tension at either a relatively low magnitude or a relatively high magnitude; and
control means operable in one respect to press one of the nip-rollers against the drive capstan and to adjust one of the two regulating means to raise the tension to a relatively high magnitude of the section of the tape that is between the reel supplying the tape and said one nip-roller, and adjacent the transducer means when the tape travels in one direction,
the control means being operable in a second respect to press the other nip-roller against the tape and to adjust the other regulating means to raise the tension in the section of the tape that is between the reel supplying the tape and other nip-roller and adjacent the transducer means when the tape travels in the opposite direction.

4. In a tape transport system, the combination of:
a first reel actuated by a first drive means to engage one end of the tape;
a second reel actuated by a second drive means to engage the other end of the tape;
a drive capstan actuated by a third drive means;
means including a return idler to form the tape between the two reels into a central loop having a first leg and a second leg adjacent the opposite sides, respectively, of the drive capstan;
transducer means adjacent one of the two legs;
a first nip-roller between the first reel and the return idler to press the first leg of the control loop into engagement with the drive capstan to actuate the tape and to divide the tape into two sections one of which includes the central loop;
a second nip-roller between the second reel and the return idler operable to press the second leg of the tape into engagement with the drive capstan to actuate the tape and to divide the traveling tape into two sections one of which includes the central loop;
first regulating means to regulate the first drive means to regulate the tension of the section of tape associated therewith, the first regulating means being adjustable to maintain a relatively low normal tape tension and a relatively high tape tension selectively;
second regulating means to regulate the second drive means to regulate the tension of the section of tape associated therewith, the second regulating means being adjustable to maintain a relatively low normal tape tension and a relatively high tape tension selectively;
means to control the three drive means to run the tape in opposite directions selectively and to operate each of the two reels as a supply reel and a take-up reel selectively;
means to operate one of the two nip-rollers when the first reel serves as a supply reel and to operate the other of the two nip-rollers when the second reel serves as a supply reel; and
means to adjust whichever of the regulating means controls the tension in the tape section that includes the central loop to maintain the relatively high tension in the central loop when the one nip-roller is operated and to adjust the other regulating means for high tension when the other of the two nip-rollers is operated.

5. A combination as set forth in claim 4 in which the two nip-rollers are operable simultaneously with both of the regulating means adjusted for relatively low tape tension.

6. In a tape transport system, the combination of:

a first reel actuated by a first drive means to engage one end of the tape;

a second reel actuated by a second drive means to engage the other end of the tape;

a drive capstan actuated by a third drive means;

means including a return idler to form the tape between the two reels into a central loop having a first leg and a second leg adjacent the opposite sides, respectively, of the drive capstan;

transducer means adjacent one of the two legs;

a first nip-roller between the first reel and the return idler operable to press the first leg of the central loop into engagement with the drive capstan to actuate the tape and to divide the tape into two sections one of which includes the central loop;

a second nip-roller between the second reel and the return idler operable to press the second leg of the tape into engagement with the guide capstan to actuate the tape and to divide the tape into two sections one of which includes the central loop;

first regulating means to regulate the first drive means to regulate the tension of the tape between the first reel and the drive capstan, the first regulating means being adjustable to maintain a relatively low normal tape tension and a relatively high tape tension selectively;

second regulating means to regulate the second drive means to regulate the tension of the tape between the second reel and the drive capstan, the second regulating means being adjustable to maintain a relatively low normal tape tension and a relatively high tape tension selectively;

control means adjustable in a first respect to operate all three drive means in the direction for the first reel to serve as a supply reel, to operate the first nip-roller and to adjust for high tape tension to the first regulating means that controls the tension in the tape section that includes the central loop, the control means being adjustable in a second respect to operate all three drive means in the opposite direction for the second reel to serve as the supply reel to operate the second nip-roller and to adjust the second regulating means for high tape tension.

7. A combination as set forth in claim 6 in which the control means is adjustable in a third respect to operate both nip-rollers with both of the regulating means adjusted for normal tape tension.

8. In a tape transport system, the combination of:

a first reel actuated by a first drive means to engage one end of the tape;

a second reel actuated by a second drive means to engage the other end of the tape;

a drive capstan actuated by a third drive means;

means including a return idler to form the tape between the two reels into a central loop having a first leg and a second leg adjacent the opposite sides, respectively, of the drive capstan;

transducer means adjacent one of the two legs;

a first nip-roller between the first reel and the return idler to press the first leg of the central loop into engagement with the drive capstan to actuate the tape and to divide the tape into two sections one of which includes the central loop;

a second nip-roller between the second reel operable to press the second leg of the tape into engagement with the guide capstan to actuate the tape and to divide the tape into two sections one of which includes the central loop;

means to form a first tensioned storage loop in the tape between the first reel and the drive capstan;

means responsive to the tension in the first storage loop to regulate the first reel to maintain the storage loop under tension, the responsive means being adjustable to maintain a relatively low normal tape tension and a higher tape tension selectively;

means to form a second tensioned storage loop in the tape between the second reel and the drive capstan;

means responsive to the tension in the second storage loop to regulate the second reel to maintain the second storage loop under tension, the last mentioned responsive means being adjustable to maintain a relatively low normal tape tension and a higher tape tension selectively; and control means adjustable in a first respect to operate all three drive means in one direction to drive the tape in one direction, to operate one of the two nip-rollers, and to adjust for high tape tension whichever responsive means controls the tension of the tape section that includes the central loop, the control means being adjustable in a second respect to operate all three drive means in the other direction to drive the tape in the other direction to operate the other of the two nip-rollers and to adjust the other responsive means for higher tape tension.

9. In a tape transport system, the combination of:

a first reel actuated by a first drive means to engage one end of the tape;

a second reel actuated by a second drive means to engage the other end of the tape;

a drive capstan actuated by a third drive means;

means including a return idler to form the tape between the two reels into a central loop having a first leg and a second leg adjacent the opposite sides, respectively, of the drive capstan;

transducer means adjacent one of the two legs;

a first nip-roller between the first reel and the return idler to press the first leg of the central loop into engagement with the drive capstan to actuate the tape and to divide the tape into two sections one of which includes the central loop;

a second nip-roller between the second reel operable to press the second leg of the tape into engagement with the guide capstan to actuate the tape and to divide the tape into two sections one of which includes the central loop;

means to form a first storage loop in the section of tape corresponding to the first reel;

first spring means to exert a normal force to tend to increase the magnitude of the first storage loop to place the corresponding section of the tape under tension;

first remotely controlled means to increase the stress of the first spring means to increase the force thereof to raise the tension of the corresponding section of the tape;

first means responsive to changes in the magnitude of the first storage loop to regulate the first reel to maintain the first storage loop at a normal magnitude;

means to form a second storage loop in the section of tape corresponding to the second reel;

second spring means to exert a normal force to tend to increase the magnitude of the second storage loop to place the corresponding section of the tape under tension;

second remotely controlled means to increase the stress of the second spring means to increase the force thereof to raise the tension of the corresponding section of the tape;

second means responsive to changes in magnitude of the second storage loop to regulate the second reel to maintain the second storage loop at a normal magnitude;

control means adjustable in one respect to operate all three drive means in one direction to drive the tape in one direction, to operate one of the two nip-rollers and to operate whichever of the two remotely controlled means that controls the tension of the section of tape that includes the central loop, the control means being adjustable in a second respect to operate all three of the drive means in the opposite direction to drive the tape in the opposite direction, to operate the other of the two nip-rollers and to operate the other of the two remotely controlled means.

10. A combination as set forth in claim 9 in which the control means is adjustable in a third respect to operate both of the nip-rollers with both of the regulating means adjusted for normal tape tension.

11. In a tape transport system, the combination of:

a first reel;

a second reel;

a differential capstan assembly including a drive capstan and two nip-rollers cooperative therewith to form the traveling tape into a loop with a differential effect to maintain the loop under tension;

transducer means adjacent the loop for recording and reproducing signals;

servo means to sense the tension in the tape between the first reel and the capstan assembly and to regulate the rotation of the first reel to maintain predetermined tension in the tape, said servo means being adjustable to maintain a given relatively low tension or a given relatively high tension selectively;

servo means to sense the tension in the tape between the second reel and the capstan assembly and to regulate the rotation of the second reel to maintain predetermined tension in the tape, said second servo means being adjustable to maintain a given relatively low tension or a given relatively high tension selectively; and control means adjustable in one respect for one mode of operation of the system in which the two servos are adjusted for low tension and in which the tape is driven from the first reel to the second reel with both nip-rollers pressing the tape against the drive capstan with a differential effect to place the tape loop under tension, the control means being adjustable in another respect for another mode of operation in which the direction of the tape is reversed and in which only one nip-roller presses the tape against the drive capstan to divide the tape into an ingoing section and an outgoing section with the transducer means being located adjacent the tape of the ingoing section and with the servo loop corresponding to the ingoing section adjusted for the higher given tension.

References Cited by the Examiner

UNITED STATES PATENTS

| | | | |
|---|---|---|---|
| 2,229,480 | 1/1941 | Spencer et al. | 242—75.51 |
| 2,913,192 | 11/1959 | Mullin | 242—55.11 |
| 2,985,396 | 5/1961 | Johnson | 318—7 X |
| 3,045,937 | 7/1962 | Johnson | 242—55.12 |
| 3,155,339 | 11/1964 | Groenewegen | 242—75.51 |

FRANK J. COHEN, *Primary Examiner.*

GEORGE F. MAUTZ, *Examiner.*